Patented June 7, 1949

2,472,310

UNITED STATES PATENT OFFICE 2,472,310

PROCESS FOR PREPARING THE ETHYNYL CARBINOL OF β-IONONE

William Oroshnik, Brooklyn, N. Y., assignor to Ortho Pharmaceutical Corporation, a corporation of New Jersey No Drawing. Application March 19, 1946, Serial No. 655,607

1 Claim. (Cl. 260—617)

This invention relates to novel methods for producing organic compounds and more particularly to novel methods and steps in the methods for producing ethynyl carbinols. In one of its more specific aspects, this invention is directed to novel methods for producing α-ethynyl (β-ionol).

Prior to this invention others proposed to produce α-ethynyl (β-ionol). For the production of this compound, Thompson and Gould proposed to react β-ionone with potassium acetylide, (J. A. C. S. 15, p. 340, 1935). By employing potassium acetylide, the quantity of said carbinol produced was approximately 10% of theoretical. As late as 1944, Heilbron, a worker in the field for producing α-ethynyl carbinols, stated: "Although the literature abounds with references to the condensation of carbonyl compounds with acetylene, very few condensations involving αβ-unsaturated ketones have been described. We have found that such condensations are by no means easy to effect, the yields obtainable by the standard methods being usually poor and negligible." (Heilbron, J. S. C., 1944, p. 144.) In my copending application, Ser. No. 615,691, of September 11, 1945, now U. S. Patent No. 2,425,201, I have shown that a yield of α-ethynyl (β-ionol) of approximately 67% of theoretical could be obtained by reacting β-ionone with calcium acetylide. In the course of my other experimentations in an effort to increase the yield of α-ethynyl (β-ionol), I have discovered that this yield may be increased as high as and higher than 80% of theoretical based on the quantity of unrecovered β-ionone. Such high yields may be obtained by reacting β-ionone with lithium acetylide. According to this invention, β-ionone is reacted with lithium acetylide in an inert solvent such as liquid ammonia ($NH_3$), benzene, petroleum ether, naphtha, diethyl amine, ethyl ether, dioxane, the "Carbitol" ethers, etc. The ratio of reactants may vary, but ordinarily equimolecular quantities may be employed. This reaction takes one to three hours when liquid ammonia is used as a solvent in a temperature range of —70° C. to —40° C. Then to said reaction mass is added water and acid causing a hydrolysis of the reaction product resulting in the production of α-ethynyl (β-ionol).

The following detailed procedure is one manner of practicing this invention and is given by way of illustration and not limitation.

The lithium acetylide may be prepared in a number of different ways. Merely for the purpose of illustration, I shall describe a method for making it in liquid ammonia. 700 ccs. of liquid ammonia may be mechanically stirred in a glass reaction vessel, externally cooled by means of solid carbon dioxide or the like to maintain the temperature of the liquid ammonia below —40° C. The liquid ammonia is maintained at said temperature while a swift stream of dry, acetone-free acetylene gas is introduced to said liquid ammonia simultaneously with 8 grams of comminuted freshly-cut lithium metal. Stirring of the mass and a moderate passage of acetylene are continued for an additional 20 minutes after the introduction of all of the lithium metal particles. Throughout the entire period of these various additions, the temperature of the mass is maintained below —40° C. and preferably at —60° C. By following this procedure, the lithium acetylide is formed and dispersed in the liquid ammonia solvent. Ordinarily, most of said lithium acetylide is dissolved but some of it may remain in suspension in the liquid ammonia. This, however, does not affect the reaction in any way.

The lithium acetylide may be readily reacted with β-ionone by adding the β-ionone gradually to said solution of lithium acetylide in said liquid ammonia and maintaining the temperature of the reacting mass at about —40° C. However, in order to provide even better yields and to increase the homogeneity of the reaction mixture, any anhydrous amine as well as commercially available "absolute" ether may be added to said solution of lithium acetylide in said liquid ammonia before the addition of the β-ionone.

In the practice of this invention, I prefer to add to said solution of lithium acetylide in ammonia, about 350 ccs. of anhydrous diethyl amine. Then to this solution is gradually added over about a 15-minute period, 192 grams (1 mole) of pure β-ionone having index of refraction at 20° C. of 1.5205. This addition of β-ionone is made while the solution is continuously stirred and a moderate passage of acetylene is continued for a period of approximately three hours. After all of the β-ionone has been added and throughout this entire period as well as the period of β-ionone addition, the temperature of the mass is maintained at about —40° C. Then after said three-hour period and while maintained at said temperature, there is added to said mass about 150 ccs. of ammonium chloride which is mixed therewith and then the addition of acetylene may be terminated. Then the temperature of the mass is slowly increased to about —5° C. in order to evaporate the ammonia therefrom. In the course of this rise in temperature, a total of about 500 ccs. of U. S. P.

diethyl ether is added in portions to said mass in said vessel to maintain the desired fluidity. Subsequently, 700 ccs. cold water are added slowly in small increments. Then glacial acetic acid is slowly added until the mass is just slightly acid or neutral. The temperature of the mass during said water and acetic acid addition is maintained below 15° C. and at about 10° C. The stirring is then stopped and the mass is allowed to stand and its temperature increases to about room temperature whereupon it separates into two main layers, an ether layer and a water layer. The ether layer is separated from the water layer. The water layer may be extracted with ether and the ether layers may be combined. The combined ether layers may be washed with water, dried over anhydrous potassium carbonate and then distilled to evaporate off the ether. After the ether has been evaporated therefrom, the mass is distilled and the distillate is collected and only a negligible residue remains. The collected distillate measures approximately 206 grams and is a mixture of β-ionone and α-ethynyl (β-ionol) which may be separated from each other in any one of a number of different ways. For example, this distillate mixture may be dissolved in aqueous methanolic solution with 40 ccs. of semi-carbizide and 2 ccs. of glacial acetic acid and allowed to stand overnight. Then the resultant mass is poured into a large volume of water whereby the unreacted β-ionone in said distillate converted into semi-carbazone precipitates out as a solid and is mixed with the α-ethynyl (β-ionol) which is an oily liquid. This mixture is then shaken with petroleum ether whereupon the α-ethynyl (β-ionol) is selectively dissolved and the solid β-ionone semi-carbazone remains suspended in this solution. The mass is allowed to stand and an aqueous layer separates out. The aqueous layer is removed and the petroleum ether mixture is filtered free of the carbazone. The filtrate is recovered and first freed of the petroleum ether and then further distilled and the distillate collected is substantially pure α-ethynyl (β-ionol) measuring 155 grams, having a boiling point of about 96° C. at 0.8 mm. of mercury pressure, an index of refraction at 25° C. of 1.5009. 36 grams of unreacted β-ionone was obtained in the form of semi-carbazone having a melting point of 148° C. to 149° C. and being insoluble in water or petroleum ether. Thus the yield of α-ethynyl (β-ionol) is more than 80% of theoretical. The aforedescribed procedure has been set forth merely to illustrate the invention and is not to be regarded as limiting the invention. Various changes may be made without departing from this invention.

I claim:

A method for producing α-ethynyl (β-ionol) comprising in an inert solvent reacting lithium acetylide with β-ionone and hydrolyzing the resultant reaction product.

WILLIAM OROSHNIK.

REFERENCES CITED

The following references are of record in the file of this patent:

UNITED STATES PATENTS

| Number | Name | Date |
|---|---|---|
| 2,369,161 | Milas | Feb. 13, 1945 |

OTHER REFERENCES

Heilbron et al.: Jour. Chem. Soc., London, 1944, pages 144–7.

Davies et al.: Jour. Chem. Soc. (1935), 584–7.

Campbell et al.: Chem. Abs., vol. 35, 5457 (1941).

Johnson: Acetylenic Compounds, vol. 1, Acetylenic Alcohols. Pub. by Edward Arnold & Co., London (1946), 11–14 and 341–2.